United States Patent
Boutros et al.

(10) Patent No.: US 9,094,344 B2
(45) Date of Patent: Jul. 28, 2015

(54) ESTABLISHING A BIDIRECTIONAL FORWARDING DETECTION (BFD) ASYNCHRONOUS MODE SESSION WITHOUT KNOWING A PRIOR LAYER-2 OR LAYER-3 INFORMATION

(75) Inventors: Sami Boutros, San Ramon, CA (US); George Leonard Swallow, Boston, MA (US); Nobushige Akiya, Chiba (JP)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 13/234,331

(22) Filed: Sep. 16, 2011

(65) Prior Publication Data
US 2013/0070764 A1 Mar. 21, 2013

(51) Int. Cl.
*H04L 12/26* (2006.01)
*H04L 12/721* (2013.01)
*H04L 12/931* (2013.01)
*H04L 12/935* (2013.01)

(52) U.S. Cl.
CPC ............ *H04L 45/66* (2013.01); *H04L 49/3054* (2013.01); *H04L 49/351* (2013.01)

(58) Field of Classification Search
CPC .............................................. H04L 2012/6448
USPC ......... 370/216–225, 241, 242, 248, 250, 351, 370/389, 390; 709/227–229, 238, 239
See application file for complete search history.

(56) References Cited

U.S. PATENT DOCUMENTS

| | | | |
|---|---|---|---|
| 8,111,611 B2 | 2/2012 | Kapoor et al. | |
| 8,218,429 B2 * | 7/2012 | Wang et al. | 370/218 |
| 8,339,940 B2 * | 12/2012 | Wang et al. | 370/217 |
| 8,432,906 B2 * | 4/2013 | Wu | 370/389 |
| 8,472,450 B2 * | 6/2013 | Li et al. | 370/395.5 |
| 2011/0164501 A1 * | 7/2011 | Dunbar | 370/236.2 |
| 2011/0286324 A1 * | 11/2011 | Bellagamba et al. | 370/219 |
| 2013/0028099 A1 * | 1/2013 | Birajdar et al. | 370/242 |

OTHER PUBLICATIONS

Rosen, RFC 3031, MPLS Architecture, Internet Society, Jan. 2001, pp. 1-61.*
Katz, RFC 5880, BFD, Internet society, Jun. 2010, pp. 1-49.*
Black, OSI, Prentice Hall, 1991, pp. 1, 2, 9, 103-105.*
Wikipedia, Media Access control, Dec. 2013, pp. 1-3.*
(Continued)

*Primary Examiner* — Dmitry H Levitan
(74) *Attorney, Agent, or Firm* — The Law Office of Kirk D. Williams

(57) ABSTRACT

In one embodiment, a Bidirectional Forwarding Detection (BFD) asynchronous mode session is established between two packet switching devices interconnected by one or more physical links. Prior to L2 or L3 services being established, each of these packet switching devices does not know the Media Access Control (MAC) nor Internet Protocol (IP) addresses of each interface of the other packet switching device that is connected to one of these link(s). A request to establish a BFD session is sent from one packet switching device to the other, with a MAC frame including the request being addressed to a group, broadcast, or other address that the receiving packet switching device will recognize and thus process the received request. Based on information contained in this received MAC frame, the receiving packet switching device has the information it needs, and sends a BFD control frame to the other packet switching device.

18 Claims, 4 Drawing Sheets

(56) References Cited

OTHER PUBLICATIONS

Kompella et al, "Detecting Multi-Protocol Label Switched (MPLS) Data Plane Failures," Feb. 2006, RFC 4379, http://datatracker.ietf.org/doc/rfc4379, The Internet Society, Reston, VA, USA (fifty pages).

Katz et al, "Bidirectional Forwarding Detection (BFD) for IPv4 and IPv6 (Single Hop)," Jun. 2010, RFC 5881, http://datatracker.ietf.org/doc/rfc5881, The Internet Society, Reston, VA, USA (seven pages).

Aggarwal et al, "Bidirectional Forwarding Detection (BFD) for MPLS Label Switched Paths (LSPs)," Jun. 2010, RFC 5884, http://datatracker.ietf.org/doc/rfc5884, The Internet Society, Reston, VA, USA (twelve pages).

Boutros et al, "BFD over LAG interfaces," Jun. 2011, draft-boutros-bfd-over-lag-00, http://tools.ietf.org/html/draft-boutros-bfd-over-lag-00, The Internet Society, Reston, VA, USA (pp. 1-7).

Cisco Systems, Inc., "Ethernet Technologies," Internetworking Technologies Handbook, Chapter 7, 2000, Third Edition, Cisco Press, Indianapolis, IN (forty pages).

Cisco Systems, Inc., "Internet Protocol Multicast," Internetworking Technologies Handbook, Chapter 43, 2000, Third Edition, Cisco Press, Indianapolis, IN (sixteen pages).

* cited by examiner

ESTABLISHING A BIDIRECTIONAL FORWARDING DETECTION (BFD) ASYNCHRONOUS MODE SESSION WITHOUT KNOWING A PRIOR LAYER-2 OR LAYER-3 INFORMATION

TECHNICAL FIELD

The present disclosure relates generally to communicating information between packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Accordingly, the ability to provide communications mechanisms and methodologies that allow greater bandwidth, achieve superior performance, and/or offer minimal delay presents a significant challenge for designers of packet switching devices and network managers.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
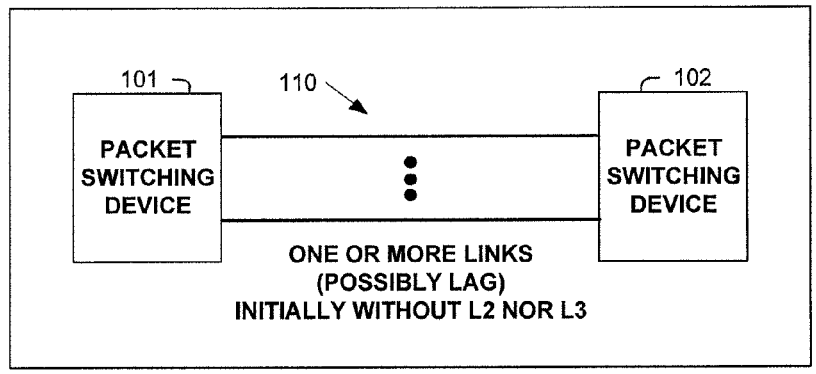
FIG. 1 illustrates a networked system configured to operate, and/or operating, according to one embodiment.

Disclosed are, inter alia, methods, apparatus, computer-storage media, mechanisms, and means associated with establishing a Bidirectional Forwarding Detection (BFD) asynchronous mode session without knowing a priori layer-2 (L2) or layer-3 (L3) information. In one embodiment, two packet switching devices are interconnected by one or more physical links (possibly comprising a bundled interface, and possibly being point-to-point Ethernet links). Prior to L2 or L3 services being established, each of these packet switching devices does not know the Media Access Control (MAC) nor Internet Protocol (IP) address of each interface of the other packet switching device that is connected to one of these link(s). BFD operates at layer 3, and therefore, BFD packets require the appropriate layer 3 information (e.g., IP address).

One embodiment includes a first packet switching device, comprising: an interface configured for communicating, over a link, with a second packet switching device; and memory and one or more processing elements configured to perforin operations. In one embodiment, these operations include: sending, to the second packet switching device over the link without the Internet Protocol (IP) and Media Access Control (MAC) addresses of the second packet switching device, a MAC frame requesting a Bidirectional Forwarding Detection (BFD) asynchronous session be established over the link; and receiving, from the second packet switching device, a BFD control packet corresponding to said sent requested BFD asynchronous session.

One embodiment includes a second packet switching device, comprising: an interface configured for communicating, over a link, with a first packet switching device; and memory and one or more processing elements configured to perform operations. In one embodiment, these operations include: receiving, from the first packet switching device over a link without the Internet Protocol (IP) and Media Access Control (MAC) addresses of the first packet switching device, a MAC frame requesting a Bidirectional Forwarding Detection (BFD) asynchronous session be established over the link; and sending a BFD control packet corresponding to said sent requested BFD asynchronous session.

In one embodiment, the destination address of the MAC frame is a multicast address; the destination MAC address of the MAC frame is an address from the IPv4 address range 127/8 or IPv6 address range 0:0:0:0:0:FFFF:7F00/104; and the MAC frame includes a first discriminator corresponding to the BFD asynchronous session from the first packet switching device; and the BFD control packet includes the first discriminator. In one embodiment, the MAC frame includes a Label Switched Path (LSP) Ping Echo Request; and the MAC frame does not include a label for switching information contained within the MAC frame.

2. Description

Disclosed are, inter alia, methods, apparatus, computer-storage media, mechanisms, and means associated with establishing a Bidirectional Forwarding Detection (BFD) asynchronous mode session without a priori knowing layer-2 (L2) or layer-3 (L3) information. In one embodiment, a BFD asynchronous mode session is established between two packet switching devices interconnected by one or more physical links. Prior to L2 or L3 services being established, each of these packet switching devices does not know the Media Access Control (MAC) nor Internet Protocol (IP) addresses of each interface of the other packet switching device that is connected to one of these link(s). A request to establish a BFD session is sent from one packet switching device to the other, with a MAC frame including the request being addressed to a group, broadcast, or other address that the receiving packet switching device will recognize and thus process the received request. Based on information contained in this received MAC frame, the receiving packet switching device has the information it needs, and sends a BFD control frame to the other packet switching device.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the team "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates packet switching device 101 and packet switching device 102, with packet switching devices 101 and 102 connected via one or more links 110 (possibly configured as a link aggregation group). Initially and prior to L2 or L3 services being established, each of these packet switching devices 101 and 102 does not know a priori the Media Access Control (MAC) nor Internet Protocol (IP) address of each interface of the other packet switching device (101, 102) that is connected to one of these link(s) 110. BFD operates at layer 3, and therefore, BFD packets require the appropriate layer 3 information (e.g., IP address).

In one embodiment, packet switching device 101 sends, to packet switching device 102 over a link 110 without the Internet Protocol (IP) and Media Access Control (MAC) addresses of packet switching device 102, a MAC frame requesting a Bidirectional Forwarding Detection (BFD) asynchronous session be established over the link 110. Packet switching device 102 receives the MAC frame requesting a Bidirectional Forwarding Detection (BFD) asynchronous session be established over link 110; and in response, sends a BFD control packet corresponding to said requested BFD asynchronous session. In one embodiment, the destination address of the MAC frame is a special MAC address that packet switching device 102 will recognize as being sent to packet switching device 102. In one embodiment, the special MAC address is a multicast address. In one embodiment, the destination IP address included in the MAC frame is an address from the IPv4 address range 127/8 or IPv6 address range 0:0:0:0:0:FFFF:7F00/104. In one embodiment, the MAC frame includes a first discriminator corresponding to the BFD asynchronous session from packet switching device 101; and the BFD control packet includes the first discriminator. In one embodiment, the MAC frame includes a Label Switched Path (LSP) Ping Echo Request; and the MAC frame does not include a label for switching information contained within the MAC frame.

Figure 2:
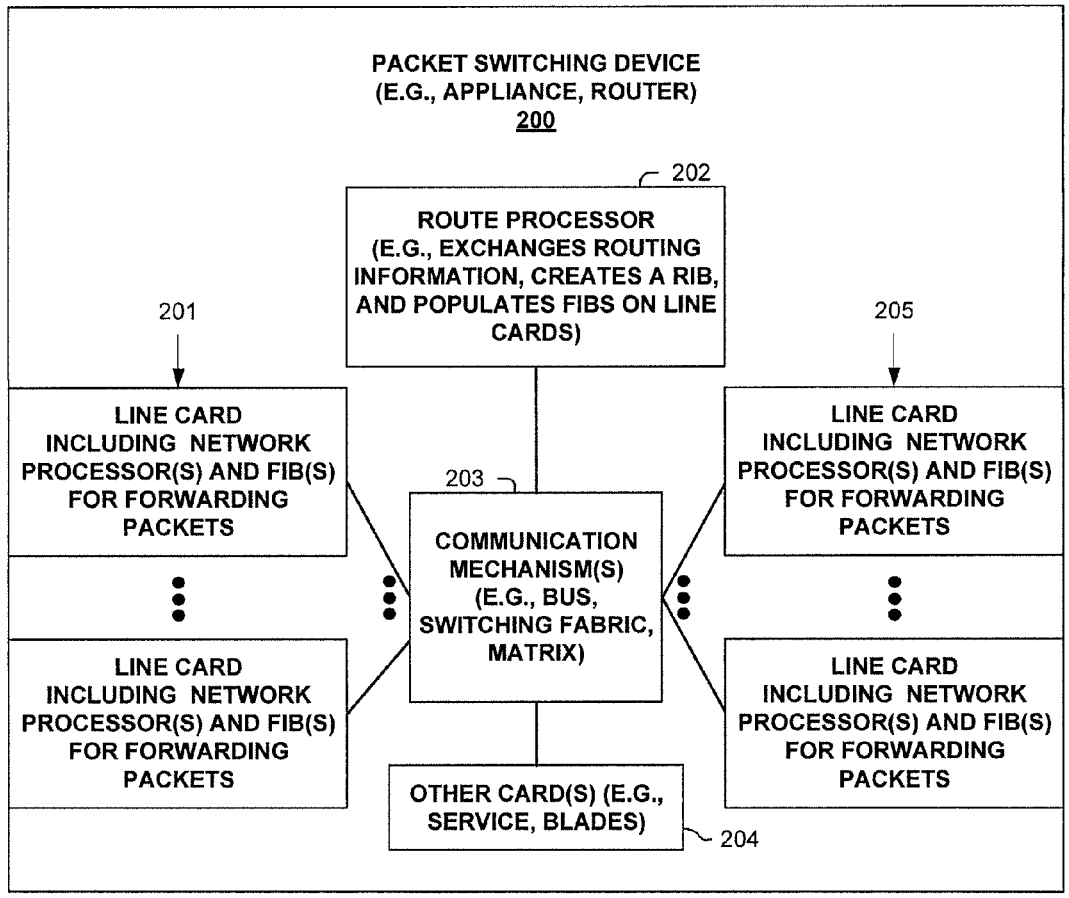
FIG. 2 illustrates a packet switching device configured to operate, and/or operating, according to one embodiment.

One embodiment of packet switching device 200 (e.g., appliance, router) is illustrated in FIG. 2. As shown, packet switching device 200 includes line cards 201 and 205, each with one or more Forwarding Information Bases (FIBs) for use in forwarding packets. Additionally, packet switching device 200 also has a route processor 202, which typically manages the control plane by communicating routing information with other packet switching devices, populates one or more Routing Information Bases (RIBs), and populates one or more FIBs in line cards 201 and 205. Line card 200 also includes other cards 204 (e.g., service cards, blades), and some communication mechanism 203 (e.g., bus, switching fabric, matrix) for allowing its different entities 201, 202, 204 and 205 to communicate.

Figure 3:
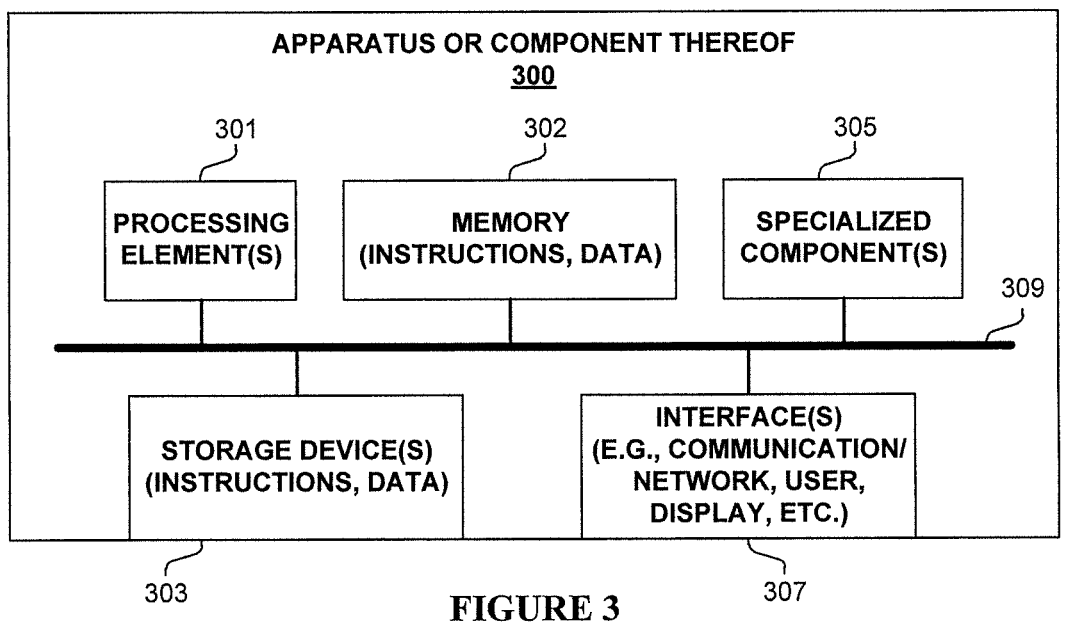
FIG. 3 illustrates an apparatus or component configured to operate, and/or operating, according to one embodiment.

FIG. 3 is a block diagram of an apparatus or component 300 used in one embodiment associated with establishing a Bidirectional Forwarding Detection (BFD) asynchronous mode session without layer-2 (L2) or layer-3 (L3) information. In one embodiment, apparatus or component 300 performs one or more processes corresponding to one of the flow diagrams illustrated or otherwise described herein, and/or illustrated in another diagram or otherwise described herein.

In one embodiment, apparatus or component 300 includes one or more processing element(s) 301, memory 302, storage device(s) 303, specialized component(s) 305 (e.g. optimized hardware such as for performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of a particular application. In one embodiment apparatus or component 300 corresponds to, or is part of, packet switching device 101 and/or 102 of FIG. 1.

Various embodiments of apparatus or component 300 may include more or fewer elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/ or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 4:
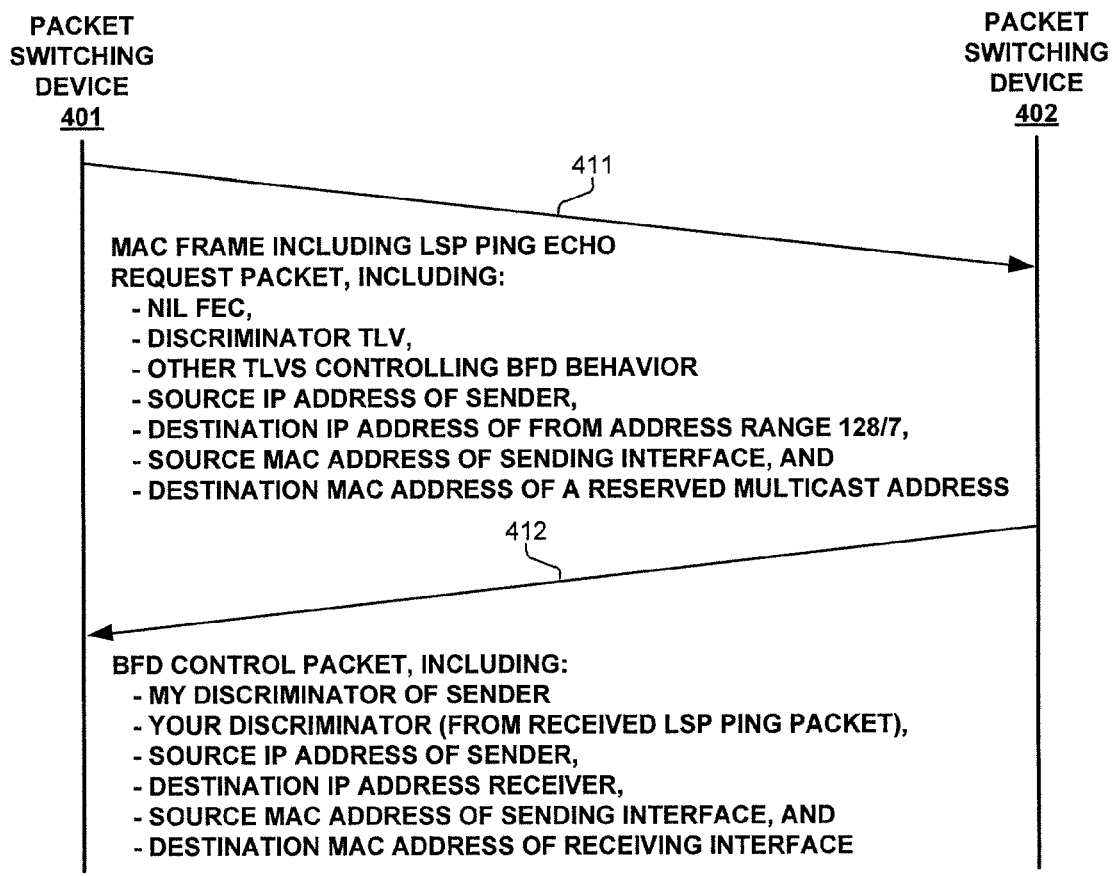
FIG. 4 illustrates a process configured to be performed, and/or performed, in one embodiment.

FIG. 4 illustrates a process performed in one embodiment. Packet switching device 401 desires a BFD asynchronous mode session be established between itself and packet switching device 402 over one or more links. Prior to L2 and L3 services coming up, packet switching device 401 does not know the MAC address nor IP address of the interface of packet switching device 402.

Packet switching device 401 builds a MAC frame including an IP packet/UDP request for packet switching device 402 to send a BFD control packet establishing the BFD session. This MAC frame includes a special destination MAC address such that packet switching device 402 will recognize that the MAC frame is destined for itself. In one embodiment, this special destination MAC address is a MAC group address (e.g., a reserved Multicast MAC address defined within the scope of IEEE 802.1ad), a broadcast address, or another MAC address that packet switching device 402 will recognize as being addressed for itself.

In one embodiment, this request is in the form of an LSP Ping Echo Request Packet, including: a NIL Forwarding Equivalence Class (FEC); a discriminator Type Length Value (TLV) specifying packet switching device 401's discriminator to be used for the BFD session; zero or more other TLVs containing information (e.g., bundle min active link) controlling the behavior of BFD; the source IP address being the IP address of the sending interface of packet switching device 401; the destination IP address being an address from the IPv4 address range 127/8 (e.g., 127.0.0.x) or IPv6 address range 0:0:0:0:0:FFFF:7F00/104; the source MAC address being the MAC address of the sending interface of packet switching device 401; and the destination MAC address being a reserved multicast MAC address.

Packet switching device 401 sends (411) this MAC frame to packet switching device 402, which, based on the special MAC address, recognizes it should process the received MAC frame.

In response, packet switching device 402 builds a BFD control packet to establish the BFD asynchronous mode session between packet switching devices 401 and 402 (and possibly according to one or more other values communicated for controlling the BFD asynchronous mode session), and packet switching device 402 sends (412) an UDP/IP Packet/MAC frame including this BFD control packet to packet switching device 401. In one embodiment, this MAC frame including the BFD control packet includes: My Discriminator defined by packet switching device 402; Your Discriminator received in request (411); source IP address of the sending interface of packet switching device 402; destination IP address of the receiving interface of packet switching device 401 (defined in request 411); source MAC address of the sending interface of packet switching device 402; and destination IP address of the receiving interface of packet switching device 401 (defined in request 411).

Packet switching device 402 sends (412) this MAC frame (including the BFD control packet) to packet switching device 402, which receives and process it, thus, establishing the BFD asynchronous mode session between packet switching devices 401 and 402.

In one embodiment, this process is repeated for each link of a set of links (e.g., part of a link aggregation group, link bundle).

Figure 5:
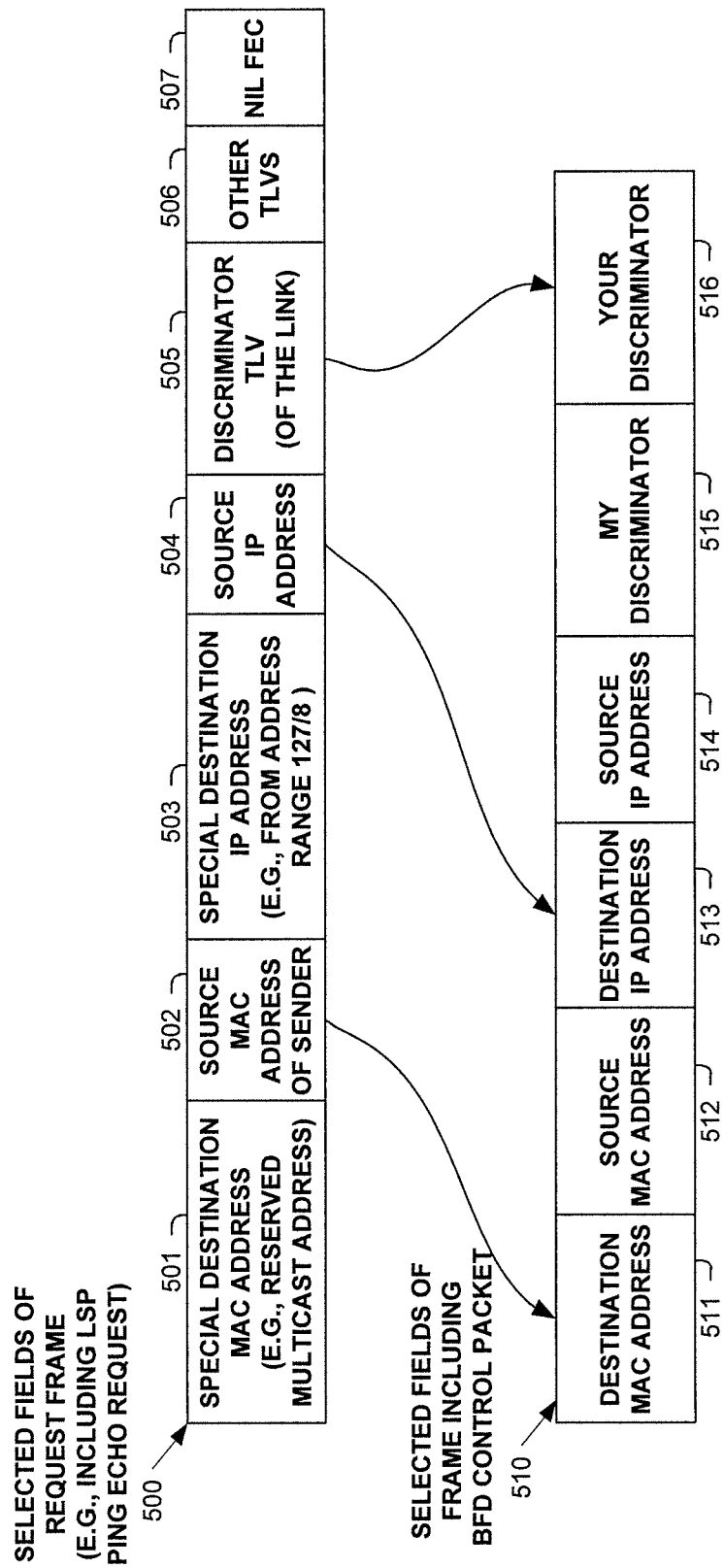
FIG. 5 illustrates selected fields of messages configured to be sent and received in one embodiment.

FIG. 5 illustrates the information communicated in one embodiment, such as, but not limited to, in messages 411 and 412 of FIG. 4. At the top of FIG. 5 is shown selected fields of the request frame 500 (e.g., including, in one embodiment, an LSP Ping Echo Request), which includes: a special MAC destination address 501 (e.g., reserved multicast address as the MAC address of the destination is not yet known); source MAC address 502 of sender (e.g., corresponding to the interface from which the packet is sent); a special destination IP address 503 (e.g., an address from the IPv4 address range 127/8 or IPv6 address range 0:0:0:0:0:FFFF:7F00/104 as the IP address of the destination is not yet known); source IP address 504 (e.g., corresponding to the interface from which the packet is sent); discriminator TLV 505 (including the discriminator for the link from the perspective of the sending packet switching device); possibly other TLVs (506) containing information for controlling the behavior of at least one corresponding BFD session; and FEC 507 (e.g., NIL).

At the bottom of FIG. 5 is shown selected fields of the frame 510 (including the BFD control packet), which includes: MAC destination address 511 (known from field 502 of received frame 500); source MAC address 512 (of sending interface); destination IP address 513 (known from field 504 of received frame 500); source IP address 514 (of sending interface); My Discriminator 515 (defined by sender for use in the BFD session over the link); and Your Discriminator 516 (known from field 502 of received frame 500).

Therefore, one embodiment receives the information it needs to send a complete BFD control frame to its paired packet switching device over a link for which layer-2 nor layer-3 services are available. Further, once layer-2 and layer-3 are up on the link, the same MAC and IP addresses and discriminators can be used for the BFD session established over the link. Additionally, one or more TLVs 506 may be included in request frame 500, which include information for controlling how BFD behaves. For example, one embodiment communicates the "bundle min active link" information for use when the link (over which the BFD asynchronous mode session is to operate) is part of a link aggregation group or other link bundle. Thus, request frame 500 can be used to communicate any needed information before L2 nor L3 are operating.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
performing operations by a first packet switching device, with said operations including:
sending, from a first interface of the first packet switching device to a second interface of a second packet switching device that is connected to the first packet switching device over a point-to-point link, a Media Access Control (MAC) frame requesting a Bidirectional Forwarding Detection (BFD) asynchronous session be established over the link, with the second interface associated with a unique MAC address to use in sending and receiving packets, and with the MAC Frame including a group, broadcast or other MAC address as the destination address of the MAC frame that is not the unique MAC address but is a destination address that the second packet switching device will recognize and thus process the received MAC frame requesting the BFD asynchronous session be established over the link; and
receiving a BFD control packet from the second packet switching device responding to said sent requested BFD asynchronous session.

2. The method of claim 1, wherein the destination address of the MAC frame is not a group MAC address nor a broadcast MAC address.

3. The method of claim 2, wherein a destination IP address included in the MAC frame is an address from the IPv4 address range 127/8 or IPv6 address range 0:0:0:0:0:FFFF:7F00/104.

4. The method of claim 3, wherein the MAC frame includes a first discriminator corresponding to the BFD asynchronous session from the first packet switching device; and the BFD control packet includes the first discriminator.

5. The method of claim 1, wherein the destination address of the MAC frame is a multicast address; a destination IP address included in the MAC frame is an address from the IPv4 address range 127/8 or IPv6 address range 0:0:0:0:0:FFFF:7F00/104; and the MAC frame includes a first discriminator corresponding to the BFD asynchronous session from the first packet switching device; and the BFD control packet includes the first discriminator.

6. The method of claim 1, wherein the MAC frame includes one or more values, other than a discriminator, for controlling the operation of said BFD asynchronous session.

7. A method, comprising:
performing operations by a second packet switching device, with said operations including:
receiving, on a second interface of the second packet switching device from a first packet switching device that is connected to the first packet switching device over a point-to-point link, a Media Access Control (MAC) frame requesting a Bidirectional Forwarding Detection (BFD) asynchronous session be established over the link, with the second interface associated with a unique MAC address to use in sending and receiving packets, and with the MAC Frame including a group, broadcast or other MAC address as the destination address of the MAC frame that is not the unique MAC address but is a destination address that the second packet switching device will recognize and thus process the received MAC frame requesting the BFD asynchronous session be established over the link; and
sending a BFD control packet from the second packet switching device in response to said sent requested BFD asynchronous session.

8. The method of claim 7, wherein the destination address of the MAC frame is not a group MAC address nor a broadcast MAC address.

9. The method of claim 8, wherein a destination IP address included in the MAC frame is an address from the IPv4 address range 127/8 or IPv6 address range 0:0:0:0:0:FFFF:7F00/104.

10. The method of claim 9, wherein the MAC frame includes a first discriminator corresponding to the BFD asynchronous session from the first packet switching device; and the BFD control packet includes the first discriminator.

11. The method of claim 7, wherein the destination address of the MAC frame is a multicast address; a destination IP address included in the MAC frame is an address from the IPv4 address range 127/8 or IPv6 address range 0:0:0:0:0:FFFF:7F00/104; and the MAC frame includes a first discriminator corresponding to the BFD asynchronous session from the first packet switching device; and the BFD control packet includes the first discriminator.

12. A first packet switching device, comprising:
a first interface configured to communicate over a point-to-point link with a second interface of a second packet switching device, with said communication including:
sending, from the first interface to the second interface a Media Access Control (MAC) frame requesting a Bidirectional Forwarding Detection (BFD) asynchronous session be established over the link, with the second interface associated with a unique MAC address to use in sending and receiving packets, and with the MAC Frame including a group, broadcast or other MAC address as the destination address of the MAC frame that is not the unique MAC address but is a destination address that the second packet switching device will recognize and thus process the received MAC frame requesting the BFD asynchronous session be established over the link; and
receiving a BFD control packet from the second packet switching device responding to said sent requested BFD asynchronous session;
memory; and
one or more processing elements configured to perform operations including establishing the BFD asynchronous session.

13. The first packet switching device of claim 12, wherein the destination address of the MAC frame is a multicast address; a destination IP address included in the MAC frame is an address from the IPv4 address range 127/8 or IPv6 address range 0:0:0:0:0:FFFF:7F00/104; and the MAC frame includes a first discriminator corresponding to the BFD asynchronous session from the first packet switching device; and the BFD control packet includes the first discriminator.

14. The first packet switching device of claim 13, wherein the MAC frame includes a Label Switched Path (LSP) Ping Echo Request; and the MAC frame does not include a label for switching information contained within the MAC frame.

15. A second packet switching device, comprising:
a second interface configured to communicate over a point-to-point link with a first interface of a first packet switching device, with said communication including:
receiving, on a second interface of the second packet switching device from the first packet switching device that is connected to the first packet switching device over a point-to-point link, a Media Access Control (MAC) frame requesting a Bidirectional Forwarding Detection (BFD) asynchronous session be established over the link, with the second interface associated with a unique MAC address to use in sending and receiving packets, and with the MAC Frame including a group, broadcast or other MAC address as the destination address of the MAC frame that is not the unique MAC address but is a destination address that the second packet switching device will recognize and thus process the received MAC frame requesting the BFD asynchronous session be established over the link; and sending a BFD control packet from the second packet switching device in response to said sent requested BFD asynchronous session;

memory; and one or more processing elements configured to perform operations including establishing the BFD asynchronous session.

16. The second packet switching device of claim 15, wherein the destination address of the MAC frame is a multicast address; a destination IP address included in the MAC frame is an address from the IPv4 address range 127/8 or IPv6 address range 0:0:0:0:0:FFFF:7F00/104; and the MAC frame includes a first discriminator corresponding to the BFD asynchronous session from the first packet switching device; and the BFD control packet includes the first discriminator.

17. The second packet switching device of claim 16, wherein the MAC frame includes a Label Switched Path (LSP) Ping Echo Request; and the MAC frame does not include a label for switching information contained within the MAC frame.

18. The first packet switching device of claim 12, wherein the first interface is a bundle interface, with the link being one of a plurality of bundled links associated with the first interface.

* * * * *